United States Patent [19]

Chase et al.

[11] Patent Number: 4,908,550
[45] Date of Patent: Mar. 13, 1990

[54] CATHODE RAY TUBE APPARATUS

[76] Inventors: Elaine Chase, 7 Chillington Gardens, Chandlers Ford, Hampshire; Adrian M. Clitheroe, 394 Hunts Pond Road, Titchfield Common, Fareham, Hampshire; Edward T. Shepherd, 14 Bormans Way, South Wonston, Winchester, Hampshire; Peter Beanlands, 67 Merdon Avenue, Chandlers Ford, Hampshire, all of United Kingdom

[21] Appl. No.: 114,352

[22] Filed: Oct. 27, 1987

[30] Foreign Application Priority Data

Oct. 30, 1986 [GB] United Kingdom ............... 8626018

[51] Int. Cl.$^4$ .......................................... H01J 29/06
[52] U.S. Cl. ........................................ 315/8; 315/85; 335/213
[58] Field of Search ...................... 315/8, 85; 335/210, 335/211, 212, 213

[56] References Cited

U.S. PATENT DOCUMENTS 2,962,621 11/1960 Fernald ................................. 315/8

Primary Examiner—Robert L. Griffin
Assistant Examiner—T. Salindong
Attorney, Agent, or Firm—Joseph J. Connerton; Robert L. Troike; Mark S. Walker

[57] ABSTRACT

Cathode ray tube apparatus including compensation (14) for the vertical component of terrestrial and of other ambient magnetic fields (15). The compensation is achieved by the generation of an opposing vertical magnetic field by energization of the degauss coil (11, 12) in the apparatus. Two embodiments are described: one applies a continuous direct current (21) after the degaussing operation and the other applies a direct current component coincident with the degaussing signal to permanently magnetize components of the apparatus. The magnitude and polarity of the compensation provided may be variable.

10 Claims, 5 Drawing Sheets

CATHODE RAY TUBE APPARATUS

TECHNICAL FIELD OF THE INVENTION

The present invention relates to cathode ray tube display apparatus and in particular to an apparatus capable of producing residual magnetism in opposition to the vertical component of the terrestrial and other ambient magnetic fields using a degauss coil already present in the apparatus.

BACKGROUND ART

A color display system utilizing a color cathode ray tube (CRT) is liable to gradual degradation of performance due to various parts gradually becoming magnetized. In particular, the shadow mask of a color CRT tends to become magnetized, causing electron beams to be deflected such that they no longer hit the front screen at the correct location and consequently fall on a region containing phosphor which emits an incorrect color. This leads to impurity in the color of the resultant image.

It is well known in the art that the amplitude of this magnetization may be reduced to an acceptable level by the use of a degauss coil, that is, a coil in the region of the CRT through which a decaying sinusoidal current is passed. Improved results can be obtained by using a pair of degauss coils on opposite sides of the CRT, thereby producing a more uniform degaussing field around the CRT.

Unwanted magnetism can also be generated outside the CRT itself; the two major sources are:
(1) the terrestrial magnetic field; and
(2) locally produced magnetism, e.g., from powerful electric motors It is also desirable in high-quality color display systems of this type to compensate for these magnetic fields. Unfortunately, these cannot be eliminated by degaussing. Indeed, the problem may be exacerbated by degaussing since this magnetizes the ferromagnetic components of the CRT in a manner corresponding to the ambient magnetic field. Thus, after degaussing, the ferromagnetic components produce a magnetic field aligned with and adding to the ambient field.

Since the maximum amplitude of the vertical terrestrial component is approximately twice that of the horizontal terrestrial components, it is more important to compensate for the vertical component. Although there are techniques available for reducing both components of the terrestrial field, generally compensation is only provided for the vertical component.

An established technique for providing a fixed amount of compensation for the vertical magnetic component involves varying the position of the deflection coil yoke along the CRT neck. This is only feasible at the time of manufacture of the CRT.

There have been various attempts at compensating for terrestrial and other ambient magnetic fields once the display system is in use. One of these is disclosed in EP 77112 (Hazeltine) which describes a system for generating a magnetic field to counteract the component of the ambient field axial to the CRT (i.e. approximately horizontal) by the use of two coils, one on the viewing side of the CRT around its edge and the other parallel to the first but located behind the screen, towards the CRT yoke. These coils are permanently driven with a current generated in response to feedback signals from sensors at the corners of the screen which detect directly the beam landing error caused by the axial component of the terrestrial and other ambient magnetic fields. This method is moderately complex and expensive and prohibits the use of the entire screen for information display since the screen corners are obscured by the sensors.

Another compensation method is disclosed in EP 39502 (Siemens) in which three pairs of coils are arranged orthogonally around the CRT to compensate for all three orthogonal components of the ambient magnetic field. The signals to drive the coils are derived from orthogonally mounted Hall-effect sensors detecting the strength of the ambient magnetic fields in the three directions. The individual signal from each sensor is amplified and applied to the respective pair of coils. This method has the disadvantage that it is both complex to implement and expensive.

Yet another compensation method is disclosed in UK 1,493,311 (Sony). This is concerned with compensating for the two horizontal components of magnetic field. Instead of reducing the amplitude of some or all of the orthogonal components of the magnetic field over the majority of the length of the tube (as in the previous two examples), this technique utilizes a coil around the CRT yoke to produce a localized magnetic field to counterbalance the effect of the two horizontal components of the ambient field over the rest of the beam path (particularly through the CRT bell). This has the advantage that only one additional coil is required. However, it has the disadvantage that in the coil location used, it is necessary to drive the coil not with a simple constant direction current but with a complex double sawtooth waveform symmetrical about zero current. This makes this method expensive.

A similar compensation method is disclosed in JA 58-138191A (Mitsubishi Denki). This is concerned with compensating for all three orthogonal components of the ambient magnetic field and, like Sony, it uses an additional coil around the CRT yoke.

DISCLOSURE OF THE INVENTION

All of the prior art methods described above require the modification of a standard display system by the inclusion of additional magnetic field generating components, such as coils. The present invention derives from the realization that such additional coils are unnecessary and that suitably orientated degauss coils already in the apparatus can be used to compensate for unwanted vertical fields.

Furthermore, only a relatively simple modification is required to enable the apparatus to be set up in the factor for use at any required latitude or to be re-calibrated if necessary. Alternatively, the amount of compensation applied can be made automatically variable, so that no modification is required either in the factory or once in the field to allow for use at different latitudes.

Accordingly, the present invention provides a cathode ray tube apparatus including a cathode ray tube with a degauss coil for reducing magnetization of the apparatus, in which the degauss coil is also positioned, constructed and arranged to be driven to produce residual magnetism in opposition to the vertical component of the terrestrial and other ambient magnetic fields, thereby to produce a resultant vertical component of the magnetic field in the region of the cathode ray tube of lower amplitude than said vertical component of the terrestrial and other ambient magnetic fields.

Preferably, circuitry associated with the degauss coil applies to the degauss coil a time varying signal with amplitude of the form of a decaying sinusoid followed by a constant d.c. signal. Applying a decaying sinusoid to the degauss coil has the effect, well known in the art, of degaussing various components of the CRT apparatus. Applying a signal of constant non-zero amplitude to the degauss coil has the effect of producing residual magnetism of a polarity and magnitude determined by the polarity and amplitude of the signal. This apparatus has the advantage that the additional circuitry required to produce the signal of constant non-zero amplitude is simple, consisting largely of a d.c. supply and a resistor. The position of the degauss coil within the tube and the amplitude of the d.c. signal are selected so that the residual magnetization opposes and is of similar magnitude to the vertical component of magnetism to be reduced or preferably eliminated.

Preferably, the circuitry includes an a.c. signal source, means for modifying the a.c. signal to produce a decaying sinusoid, a d.c. signal source and a changeover switch for connecting firstly the decaying sinusoid and subsequently the d.c. signal to the degauss coil.

Alternatively, circuitry associated with a degauss coil applies to the degauss coil a time varying signal with amplitude of the form of a decaying sinusoid with non-zero average amplitude, thereby to magnetize material in the apparatus to produce residual magnetism within the apparatus itself. The decaying sinusoidal signal added to the non-zero average amplitude signal has the effect of magnetizing the CRT apparatus. The strength of the resultant magnetic field is determined by the amplitude of the non-zero average amplitude signal. Accordingly, with the degauss coil or coils appropriately positioned in the tube, the strength of the resultant magnetic field can be controlled so that it opposes and cancels the unwanted ambient component. Optionally, the circuitry subsequently removes the signal from the degauss coil. This option has the further advantage that the signal to the degauss coil need only be applied as required to generate the residual magnetization. Thereafter no further power is consumed.

One arrangement to magnetize material in the apparatus includes circuitry including an a.c. signal source, means for modifying the a.c. signal to produce a decaying sinusoidal signal, a d.c. signal source and means for applying the d.c. signal and the decaying sinusoidal signal to the degauss coil at the same time. If the d.c. signal produced is of a constant amplitude, this arrangement has the advantage that it is not essential to remove the signals from the degauss coil after the sinusoid has almost completely decayed. This leaves the d.c. signal across the degauss coil which therefore continues to produce a magnetic field, additional to that produced by the magnetized CRT components. The result is therefore a stronger magnetic field to oppose and compensate for the ambient magnetic field. Alternatively the signals may subsequently be removed from the degauss coil, leaving no current flowing and therefore reducing the power consumption.

Another arrangement to magnetize material in the apparatus includes circuitry including an a.c. signal source, means for modifying the a.c. signal to produce a decaying sinusoidal signal, means for modifying the a.c. signal to produce a half wave rectified decaying sinusoidal signal and means for applying the latter two signals to the degauss coil. These latter two signals may subsequently be removed from the degauss coil although since both signals decay to a low level this in not essential.

Yet another arrangement to magnetize material in the apparatus includes circuitry including an a.c. signal source, means for modifying the a.c. signal to produce a decaying sinusoidal signal, means for modifying the a.c. signal to produce a half-wave rectified sinusoidal signal and means for applying the latter two signals to the degauss coil wherein the latter means is also operable to remove at least the half-wave rectified sinusoidal signal from the degauss coil. It is essential to remove the half-wave rectified sinusoidal signal from the degauss coil since the signal does not decay and would therefore continue to produce an undesirable alternating magnetic field were it not removed.

Preferably the apparatus includes means for changing the strength and polarity of the residual magnetism in order to compensate for a change in the vertical component of the ambient magnetic field.

Since the strength of the residual magnetic field is determined by the amplitude of the constant d.c. signal applied to the degauss coil in the one case or the non-zero average amplitude of the degauss signal in the other, it is a simple matter to change its value to suit the prevailing requirements.

Thus, should the vertical component of the ambient magnetic field at a particular location change, or should the apparatus be moved to a new location with a different ambient field strength, the residual magnetism can be simply modified to compensate for this change. The variation may be achieved automatically via a feedback signal from a sensor or it may be selectable by the user of the display system.

In one embodiment of the invention the degauss coil is arranged above the CRT in said CRT apparatus. In an alternative embodiment the degauss coil is in two sections, one arranged above the CRT and the other arranged below the CRT in said CRT apparatus. This has the advantage that the spatial variations of the residual magnetism over the CRT apparatus may be lower than with the previous embodiment, but this embodiment involves extra expense in the production of a two-section degauss coil.

BRIEF DESCRIPTION OF THE DRAWINGS

Accordingly, the invention will now be described with reference to the accompanying drawings, in which.

DETAILED DESCRIPTION

Figure 1:
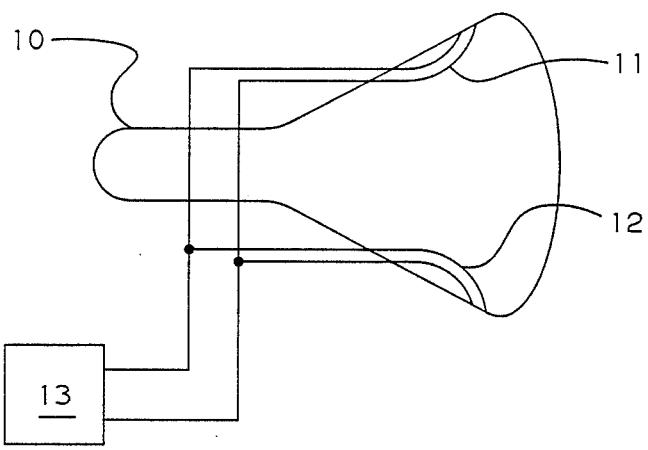
FIG. 1 is a side view of a cathode ray tube apparatus including the present invention.

As shown in FIG. 1, the CRT apparatus includes a CRT 10, a degauss coil in two sections 11, 12 arranged as saddle coils above and below the bell of the CRT and a circuit 13 for driving the degauss coil.

Figure 5:
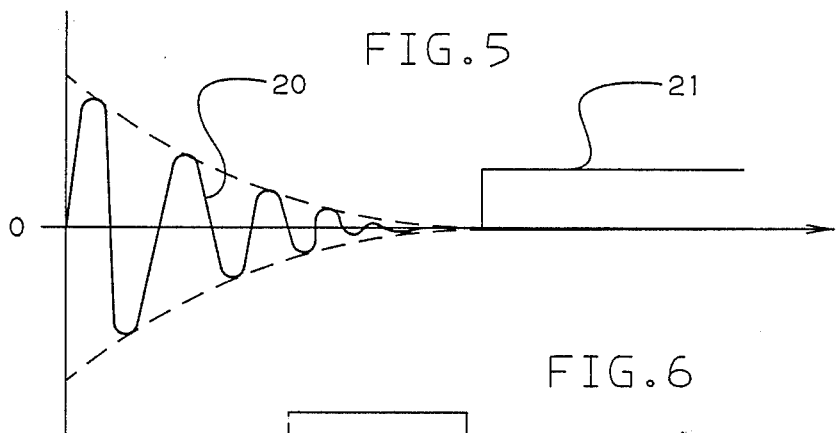
FIG. 5 is a schematic representation of the signal applied to the degauss coil in one embodiment of the invention.
Figure 6:
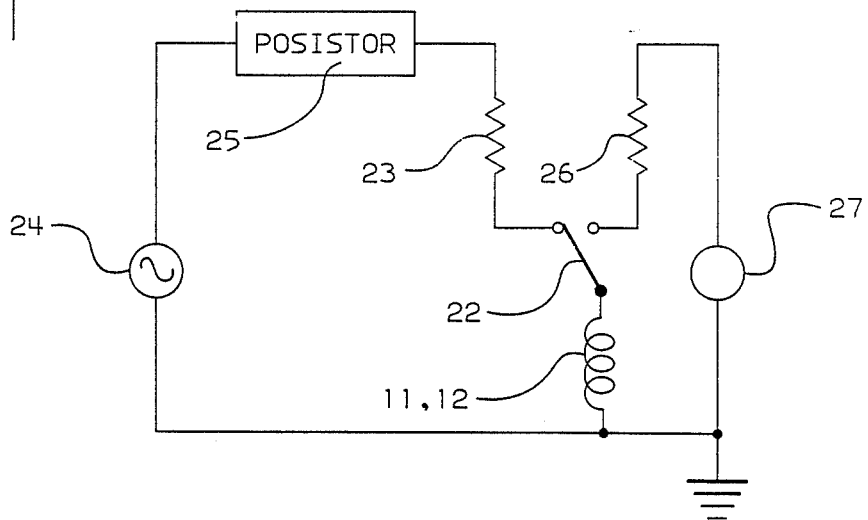
FIG. 6 is a simplified diagram of a circuit to produce the signal in FIG. 5.
Figure 2:
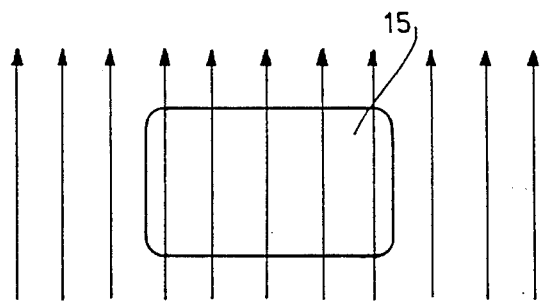
FIG. 2 is a schematic representation of the magnetic field lines in the region of a CRT in the absence of this invention.
Figure 3:
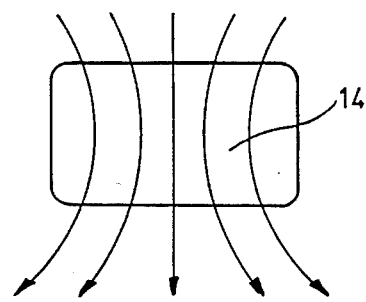
FIG. 3 is a schematic representation of the magnetic field lines, in the region of a CRT, produced by the practicing of this invention, excluding any external source of magnetism.
Figure 4:
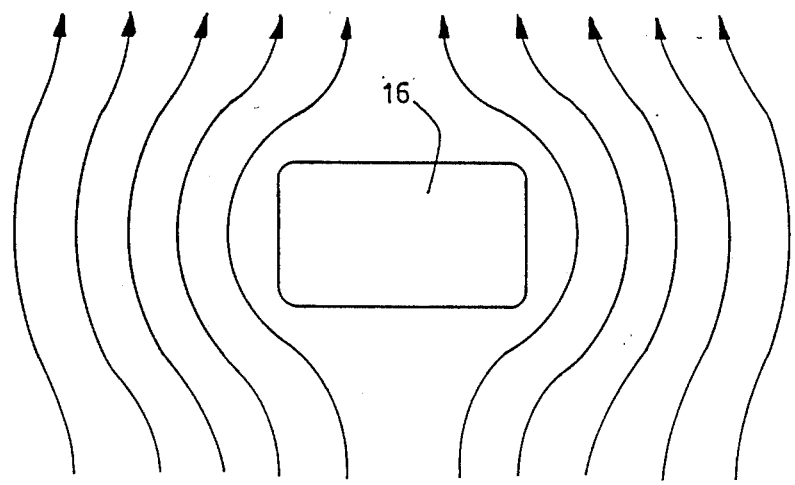
FIG. 4 is a schematic representation of the magnetic field lines in the region of a CRT showing the effect of the practicing of this invention on the magnetic field lines shown in FIG. 2.

In one embodiment the degauss coil is driven with the signal shown in FIG. 5, produced by the circuit of FIG. 6. The decaying sinusoid 20 is produced when the switch 22 is thrown to the left to make contact with resistor 23. An alternating current flows from AC voltage source 24 through posistor 25, resistor 23 and degauss coil 11, 12 causing the posistor to heat up. This in turn causes the posistor's resistance to increase and therefore the current to decrease as shown in FIG. 5. This has the effect of degaussing the CRT apparatus. Once the signal has decayed to a low level, the switch 22 is thrown to connect to resistor 26 so that a constant direct current 21 flows from DC voltage source 27 via resistor 26 through the degauss coil 11, 12. This produces a largely-vertical magnetic field 14 in the region of the bell of the CRT as shown in FIG. 3. This magnetic field is selected to be in opposition to the ambient magnetic field 15 shown in FIG. 2, such that the resultant magnetic field 16 will be of the form shown in FIG. 4, i.e. with a low amplitude of vertical magnetic field in the CRT bell. This reduction in the amplitude of the vertical magnetic field produces less unwanted deflection of the electron beams so the purity of the color image produced by the CRT is improved.

Figure 7:
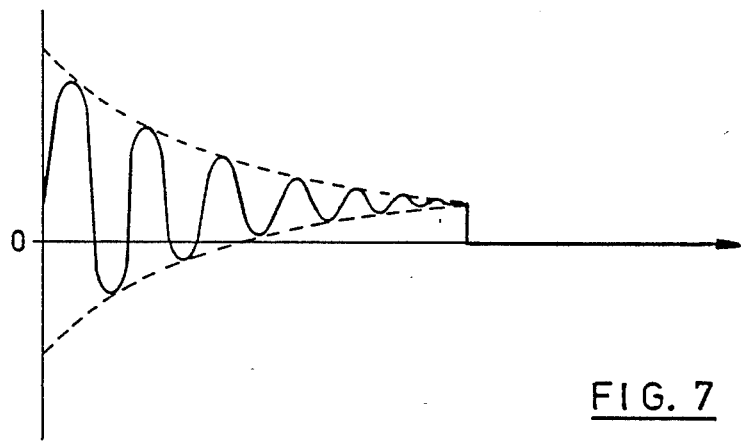
FIG. 7 is a schematic representation of the signal applied to the degauss coil in another embodiment of the invention.
Figure 8:
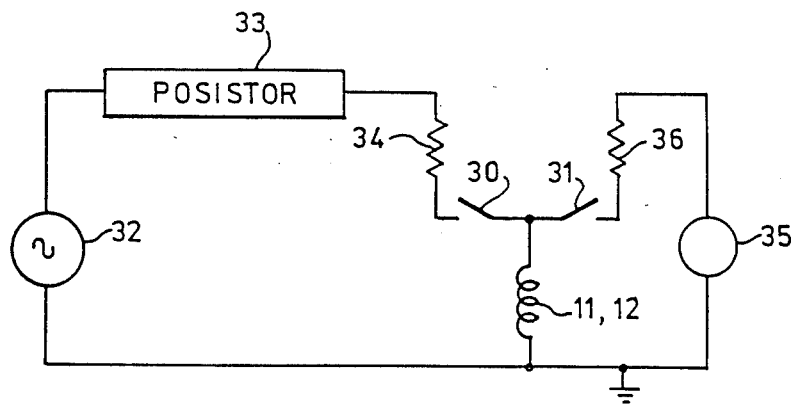
FIG. 8 is a simplified diagram of a circuit to produce the signal in FIG. 7.

In another embodiment of the invention, the circuit shown in FIG. 8 drives the degauss coil 11, 12 with a signal of the form shown in FIG. 7, i.e., a decaying sinusoid which is offset from the zero level, followed by a zero signal after the sinusoid has fully decayed.

The cycle is initiated by closing both switches 30, 31 simultaneously so that the decaying sinusoid from the AC voltage source 32, posistor 33 and resistor 34 is added to the constant direct current from DC voltage source 35 and resistor 36 and applied to the degauss coil 11, 12. After the AC component has decayed to a low level the switches 30, 31 are both opened and the degauss coil is de-energized.

This has the effect of magnetizing the shadow mask inside the CRT and also any other magnetizable components in the apparatus. If the magnetizable components are suitably arranged, they can produce a magnetic field similar to that shown in FIG. 3 which counteracts the ambient magnetic field's vertical component as previously described.

As an alternative, the switches 30, 31 may be omitted and the resistors 34, 36 connected together and to the degauss coil 11, 12. This leave a continuous direct current flowing in the degauss coil which therefore produces a static magnetic field. This magnetic field is approximately aligned with that produced by the magnetization of the magnetizable components in the apparatus, and so the total magnetic field generated by the apparatus is stronger than if the switches 30, 31 are included and opened. This more effectively counteracts the effects of the vertical component of the ambient magnetic field. The drawback of this alternative is that as a result of continuously energizing the degauss coil, the power consumption of the apparatus is increased.

Figure 9:
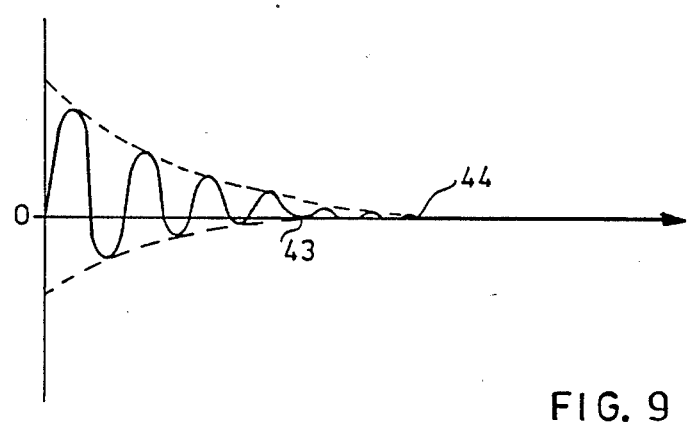
FIG. 9 is a schematic representation of the signal applied to the degauss coil in a variant of the embodiment shown in FIGS. 7 and 8.
Figure 10:
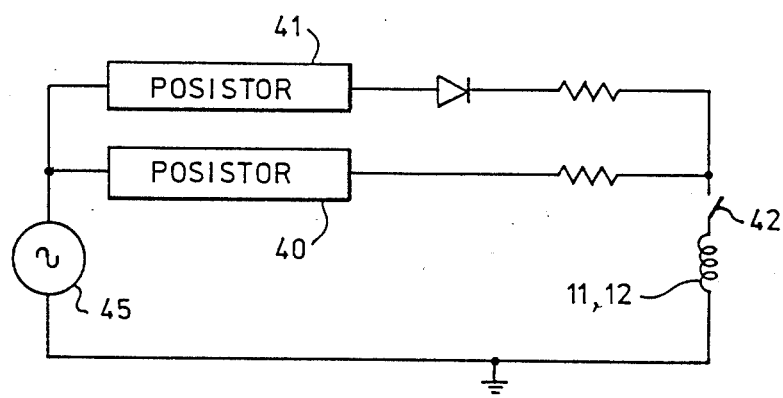
FIG. 10 is a simplified diagram of a circuit to produce the signal in FIG. 9.

A broadly similar mechanism for magnetizing the apparatus is shown in FIG. 10 producing the waveform shown in FIG. 9. This is a decaying sinusoid with d.c. offset but the d.c. offset is not constant. It is therefore more difficult to predict the strength of the magnetic field that is produced by the magnetizable components after the signal is applied to the degauss coil but it has the advantage that a DC supply is not required. As shown in FIG. 10, two posistors 40, 41 are used, posistor 40 producing a decaying sinusoid centered about the zero level and posistor 41 producing a half-wave rectified decaying sinusoid. These two signals are added and applied to the degauss coil 11, 12 when switch 42 is closed. Ideally, posistor 41 will have a longer decay time than posistor 40; this is the situation shown in FIG. 6, where posistor 40 has decayed by time 43 and posistor 41 has decayed by time 44. Optionally switch 42 may be omitted leaving a negligible current flowing in the coil 11, 12.

Figure 11:
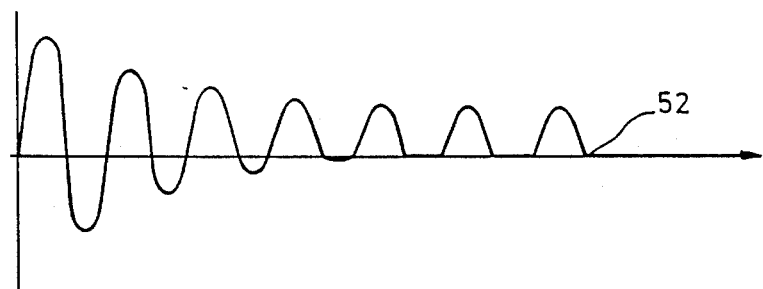
FIG. 11 is a schematic representation of the signal applied to the degauss coil in a further variant of the embodiment shown in FIGS. 7 and 8.
Figure 12:
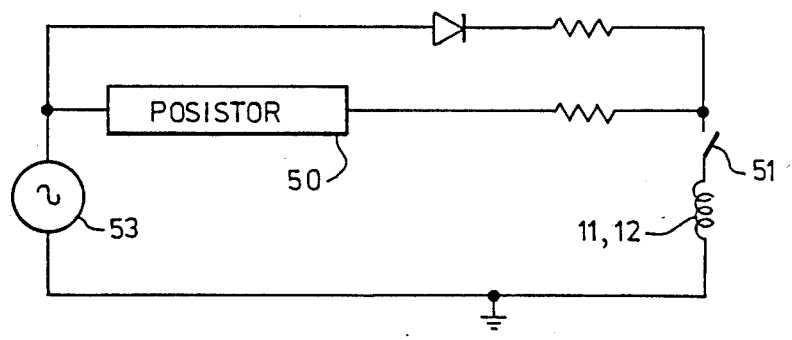
FIG. 12 is a simplified diagram of a circuit to produce the signal in FIG. 11.

Another similar mechanism for magnetizing the apparatus is shown in FIG. 12 producing the waveform shown in FIG. 11. This is a decaying sinusoid added to a half-wave rectified sinewave. The circuit is similar to that of FIG. 10 except that posistor 41 is absent. This saves the expense of the second posistor, but means that switch 51 is essential, since the half-wave rectified component will not decay so it must be turned off by opening switch 51 at time 52, otherwise the degauss coil will continue generating an undesirable oscillating magnetic field.

The variations in the vertical component of the terrestrial magnetic field mean that no correction is required on the equator, positive correction of increasing amplitude is required the further north the display is used from the equator and, similarly, negative correction of increasing amplitude is required the further south the display is used from the equator. There are various mechanisms for varying the amplitude and direction of the d.c. signal in the first embodiment or the average amplitude of the decaying sinusoid in the subsequent embodiments to produce the compensation required.

For automatic compensation, one suitable mechanism is to include a Hall-effect or other magnetism sensor arranged to detect the vertical magnetic component around the CRT and to control the coil current in response to this sensor output. Thus, when the display system is moved further away from the equator, the vertical magnetic component increases in amplitude, this is detected by the sensor and the d.c. signal in the first embodiment or the average amplitude of the decaying sinusoid in the subsequent embodiments is increased to compensate. This mechanism is somewhat expensive but has the advantage that compensation is automatically varied.

A second mechanism is to provide either a multi-position switch or a continuously-variable control (e.g.

potentiometer) such that a user of the display can vary the d.c. signal or the average amplitude of the decaying sinusoid directly, in response either to an instruction manual or to unacceptable display purity. This is a lower cost mechanism than that above.

A third mechanism is to produce a range of display systems, each with a different, fixed d.c. signal or average amplitude of decaying sinusoid and each therefore suitable for a particular latitude range. This does not provide the flexibility of the previous two options operating successfully in any part of the world, but it may be less expensive.

What is claimed is:

1. A cathode ray tube apparatus including a cathode ray tube (10) with a degauss coil (11, 12) for reducing magnetization of the apparatus and circuitry (13) coupled to the degauss coil, in which the degauss coil is positioned, constructed and arranged and said circuitry (13) produces a signal that drives said coil having a decaying time varying component and a non-zero dc component to produce residual magnetism (14) in opposition to the vertical component of the terrestrial and other ambient magnetic fields (15), thereby to produce a resultant vertical component of the magnetic field (16) in the region of the cathode ray tube of lower amplitude than said vertical component of the terrestrial and other ambient magnetic fields (15).

2. A cathode ray tube apparatus as claimed in claim 1, in which circuitry (13) associated with the degauss coil applies to the degauss coil a time varying signal with amplitude of the form of a decaying sinusoid (20) followed by a constant d.c. signal (21).

3. A cathode ray tube apparatus as claimed in claim 2, in which the circuitry (13) includes a means (24) for producing an a.c. signal, means (25) for modifying the a.c. signal to produce said time varying signal with amplitude of the form of a decaying sinusoid (20), means (27) for producing said d.c. signal and changeover switch means (22) for connecting firstly said time varying signal and subsequently said d.c. signal to said degauss coil (11, 12).

4. A cathode ray tube apparatus as claimed in claim 1 in which circuitry (13) associated with the degauss coil applies to the degauss coil a time varying signal with amplitude of the form of a decaying sinusoid with non-zero average amplitude, thereby to magnetize material in the apparatus to produce said residual magnetism within the apparatus itself.

5. A cathode ray tube apparatus as claimed in claim 4, in which said circuitry (13) subsequently removes said signal from said degauss coil.

6. A cathode ray tube apparatus as claimed in claim 4 in which said circuitry (13) includes means (32) for producing an a.c. signal, means (33) for modifying the a.c. signal to produce a time varying signal with amplitude of the form of a decaying sinusoid, means (35) for producing a d.c. signal and means for contemporaneously applying this time varying signal and this d.c. signal to the degauss coil (11, 12).

7. A cathode ray tube apparatus as claimed in claim 6, including means (30, 31) for subsequently removing the applied time varying signal and d.c. signal from the degauss coil.

8. A cathode ray tube apparatus as claimed in claim 5, in which said circuitry (13) includes means (45) for producing an a.c. signal, means (40) for modifying the a.c. signal to produce a time varying signal with amplitude of the form of a decaying sinusoid, means (41) for producing a time varying signal with amplitude of the form of a half-wave rectified decaying sinusoid and means (42) for applying these latter two signals to the degauss coil (11, 12), wherein said means (42) for applying these latter two signals to the degauss coil may also be operable to remove these two signals from the degauss coil.

9. A cathode ray tube apparatus as claimed in claim 5, in which said circuitry (13) includes means (53) for producing and a.c. signal, means (50) for modifying the a.c. signal to produce a time varying signal with amplitude of the form of a decaying sinusoid, means for producing a time varying signal with amplitude of the form of a half-wave rectified sinusoid and means (51) for applying these two signals to the degauss coil (11, 12), wherein said means (51) for applying these two signals to the degauss coil is also operable to remove at least the half-wave rectified sinusoidal signal from the degauss coil.

10. A cathode ray tube apparatus as claimed in claim 9 including means for changing the strength and polarity of the residual magnetism (14) in order to compensate for a change in the vertical component of the ambient magnetic field.

* * * * *

UNITED STATES PATENT AND TRADEMARK OFFICE
CERTIFICATE OF CORRECTION

PATENT NO. : 4,908,550
DATED : March 13, 1990
INVENTOR(S) : Brian D. Chase et al.

It is certified that error appears in the above—identified patent and that said Letters Patent is hereby corrected as shown below:

On the cover page, item [76] Inventors, replace "Elaine Chase, 7 Chillington Gardens, Chandlers Ford, Hampshire" with --Brian D. Chase, deceased,--

Signed and Sealed this

Thirteenth Day of October, 1992

*Attest:*

DOUGLAS B. COMER

*Attesting Officer*   *Acting Commissioner of Patents and Trademarks*